Patented Aug. 25, 1936

2,052,208

UNITED STATES PATENT OFFICE 2,052,208

METHOD OF PANIFICATION AND LEAVENING PREPARATIONS FOR USE IN CONNECTION THEREWITH

Rudolf Bertel, Vienna, Austria, assignor to "Delta" Technische Verkehrs-Aktiengesellschaft, Vaduz, Liechtenstein, a company of Liechtenstein No Drawing. Application August 1, 1932, Serial No. 627,221. In Austria January 18, 1932

10 Claims. (Cl. 99—91)

This invention relates to a new method of baking, and to a suitable leavening preparation for use in connection therewith. It is already known to add to dough, in addition to the substances introduced to set up fermentation (yeast, starting dough, and various organisms calculated to excite and to promote fermentation), diastatic malt extracts, for example the preparation known in the trade as "Diamalt", in a liquid or dry state, or other diastatic products of a vegetable nature.

If, for example, dough be set to ferment with yeast and Diamalt, the maltose of the malt extract serves as a nutrient for the yeast during the working of the dough, while the diastase of the malt extract exercises its favourable influence upon the colour and flavour of the finished bakery products, through the formation of dextrins, only at a higher temperature (at the commencement of the baking process). However, on account of the difficulty of handling and working in the viscous malt extracts and on account of the comparatively high price of the same, the use of these admixtures has not been able to become general practice among bakers.

The above-mentioned drawbacks can be obviated entirely if, in accordance with the present invention, the fermenting or working of the dough be caused to take place in the presence of pancreatic ferments. For this purpose either pancreatine itself is employed or, preferably, the pancreatic diastase (amylase) obtained from pancreatine, this latter being used either alone or mixed with slight quantities of pancreatine. The pancreatic diastase is mainly responsible for the saccharification of the starch, while the pancreatic trypsine acts favourably on the glutenous constituents of the flour.

Pancreatine is to be understood as including the ferment complexes from the pancreas, mainly of the calf, of the ox, and of the pig, capable of breaking up albumen, fat, and carbohydrates; and pancreatic diastase is to be understood to include the ferment complexes obtained from pancreatine which act upon carbohydrates, and which effect the breaking up of starch and glycogene.

Pancreatine, that is to say the pancreatic enzymes, exercise a saccharifying action upon the starch of the flour even when present in extremely small quantities (for instance ½ to 1% of the quantity of yeast employed), and that during the mixing and kneading of the dough which should be carried out at a temperature of 30–35° C. On the other hand, the diastase of malt extract and other vegetable diastases only act upon starch in pasty form. The pancreatic ferments, however, act upon the raw non-pasty starch from the first moment on, the maltose required for the subsequent fermentation of the yeast being thereby produced from a portion of the starch of the flour by the pancreatic diastase. In this manner the addition of the expensive and inconvenient malt extract is rendered superfluous. In the oven the pancreatic diastase (amylase) gives rise to the same improvements in regard to the colour and flavour of the finished goods as the diastase of malt extract.

The pancreatic ferments are employed in the solid (more particularly pulverulent) or in the dissolved state. The addition is effected either to the fresh yeast before compression, or to the compressed yeast, or when the yeast is mixed into the dough. They can also be added to the flour or to the water used, in fine to any component of the dough or to the dough itself, it being merely necessary that these ferments be present during the working of the dough.

A particular advantage of the baking process carried out in the presence of pancreatic ferments lies in the possibility of influencing the hydrogen ion concentration at which the pancreatic ferments are caused to act, through correct proportioning of the admixtures, in such a manner that the action either of the amylolitic or of the tryptic ferments of the pancreatine is predominant, according to requirement and need, experience showing, in accordance with the invention, that by the maintenance of an acid reaction the action of the diastatic ferments of the pancreatine is increased, while by the maintenance of an alkaline reaction the tryptic ferments are stimulated to more powerful action. The choice of the substances added for this purpose will depend more particularly upon the nature of the flour, the kind of yeast employed, the water used in the mixing of the dough, and finally upon the required nature of the final product. The acid reaction can be produced by means of acid salts, for example acid calcium phosphate, or by means of acids, for example tartaric acid, and the alkaline reaction by means of organic or inorganic bases or by means of alkaline salts, for example calcium lactate. The admixture of the substances added to influence the concentration of the hydrogen ions is made to any one of the constituents required in the preparation of the dough, or to the dough itself. It will be clear that care must be taken that only such bases, acids, or salts are employed as exercise no detrimental effect upon the yeast.

For the carrying out of the new baking method a leavening preparation is suitable which consists, in accordance with the invention, of fresh yeast or dry yeast and pancreatic ferments (pancreatine or pancreatic diastase, the latter either alone or mixed with pancreatine), and, if desired, of additional acid or alkaline substances of a nature not to damage the yeast. As a dry yeast for this purpose the yeast according to U. S. Patent No. 1,859,250 is particularly well suited.

The manufacturing of the dry leavening preparations is effected by incorporation of the individual substances before, during, or after the drying of the yeast. A particularly appropriate method of manufacture consists in adding the dry pancreatic ferments to the yeast in the last stage of the process of drying the yeast, as long as the latter still possesses some superficial moisture, the drying of the yeast being thereupon concluded.

The following may serve as examples of the carrying out of the invention:

Example 1

For the making up of dough with ordinary fresh yeast, the procedure can be as follows:

To the fresh yeast stirred into lukewarm water there is added and likewise simultaneously stirred in pancreatine in the proportion of 2–3 grams of pancreatine for every 10 kilograms of flour used. This mixture is kneaded with the yeast into the dough in the usual manner, and the dough worked up in the normal way. It is only necessary to take account of the fact that a certain amount of flour is used up for conversion into maltose by the pancreatine.

The pancreatine can also equally well be added directly to the flour, by suitable mixing methods, or can be added and stirred into the dough in a watery solution.

Example 2

5 grams of pancreatic diastase are added to 1000 grams of fresh compressed yeast, the procedure being to mix this quantity of pancreatic diastase thoroughly with a portion, for instance 100 grams, of the compressed yeast, and then uniformly to distribute this mixture throughout the remaining 900 grams of the yeast. Instead of 5 grams of pancreatic diastase alone it is also possible to use this latter in commixture with slight quantities of pancreatine. After mixing, the yeast is worked up in the usual manner.

Example 3

1000 grams of fresh yeast are mixed with 5 grams of pancreatic diastase in the manner described in Example 2, the only difference being that a small quantity (for example 1–2 grams) of monobasic calcium phosphate is added to the partial quantity of 100 g. of compressed yeast, so that the final product is of weakly acid reaction.

If a weakly alkaline reaction be desired, slight quantities (for example 10 grams) of calcium lactate are employed instead of the monobasic calcium phosphate.

Example 4

For the manufacturing of dry yeast containing pancreatic ferments, the yeast prepared as in Example 1 is thoroughly mixed with 100 grams of calcium lactate, and the mixture dried in a warm dry current of air—spread out on drying racks in the form of small granules pressed through a sieve—at a temperature of about 20–25 degrees centigrade.

For the carrying out of the new baking method, dough prepared in the usual manner is set to work with yeast prepared in accordance with one of the Examples 1–4 given above, a mixture of dextrine and maltose capable of powerfully promoting the growth of the yeast being produced from the starch of the flour by the pancreatic ferments during the working of the dough.

It is also feasible to mix the dough with the usual excitants of fermentation (yeast or starting dough) in the hitherto usual manner, and then to add about 1 gram of pancreatic diastase for every 15 kilograms of dough, the most favourable concentration of the hydrogen ions being produced by further additions of acid or alkaline substances.

The choice of the nature and quantity of the individual inter-combined admixtures will clearly have to depend, in any particular instance, on the raw materials used, as also on the conditions of working, and on the desired properties and the nature of the final product.

I claim:

1. A leavening preparation consisting of fresh yeast, pancreatic diastase, and pancreatine.

2. A leavening preparation consisting of fresh yeast, pancreatic ferments, and acid admixtures of a nature not affecting the yeast detrimentally.

3. A leavening preparation consisting of fresh yeast, pancreatic ferments, and alkaline admixtures of a nature not affecting the yeast detrimentally.

4. A dry leavening preparation consisting of dry yeast, pancreatic diastase, and pancreatine.

5. A dry leavening preparation consisting of dry yeast, pancreatic ferments, and acid admixtures of a nature not affecting the yeast detrimentally.

6. A dry leavening preparation consisting of dry yeast, pancreatic ferments, and alkaline admixtures of a nature not affecting the yeast detrimentally.

7. The method of manufacturing a dry leavening preparation consisting of yeast and pancreatic ferments, which consists in adding dry pancreatic ferments to yeast when the latter is in the last phase of its drying process, as long as the same still possesses some superficial moisture, and then concluding the drying of the yeast.

8. A dry leavening preparation containing living yeast, one of the group consisting of calcium lactate and primary calcium phosphate and pancreatic enzymes.

9. A dry leavening preparation containing living yeast, readily soluble calcium salts of lactic acid and pancreatic enzymes.

10. In the preparation of bread from flour with the employment of yeast to effect controlled fermentation of the dough, the step of introducing into the dough, before commencement of fermentation, a mixture of pancreatic diastase and pancreatine in an amount of up to approximately 0.05% by weight of the total amount of flour used, whereby the diastase breaks down the starch and the pancreatine the gluten of a part of the flour, providing nutriment for the yeast simultaneously with the fermentation of the dough.

RUDOLF BERTEL.